United States Patent [19]

Shimoni

[11] Patent Number: 5,049,995
[45] Date of Patent: Sep. 17, 1991

[54] IMAGE INTENSIFIER SYSTEM
[75] Inventor: Yair Shimoni, Jerusalem, Israel
[73] Assignee: Israel Aircraft Industries Ltd., Lod, Israel
[21] Appl. No.: 467,814
[22] Filed: Jan. 19, 1990
[30] Foreign Application Priority Data
  Jan. 20, 1989 [IL] Israel .................................... 89019
[51] Int. Cl.⁵ ............................................ H04N 5/30
[52] U.S. Cl. .................... 358/211; 358/209
[58] Field of Search ............. 358/213.15–213.19, 358/228, 211, 209, 163, 166

[56]    References Cited
    U.S. PATENT DOCUMENTS

| | | | |
|---|---|---|---|
| 3,217,099 | 11/1965 | Gebel ............................... | 358/211 |
| 3,641,261 | 2/1972 | Chaplin et al. ................... | 358/211 |
| 4,488,178 | 12/1984 | Koslov et al. .................... | 358/213.17 |
| 4,524,390 | 6/1985 | Lemke ............................. | 358/213.17 |
| 4,584,606 | 2/1986 | Nagasaki ......................... | 358/209 |
| 4,739,495 | 4/1988 | Levine ............................ | 358/213.17 |
| 4,811,090 | 3/1989 | Khurana .......................... | 358/211 |
| 4,819,075 | 4/1989 | Imaide et al. ................... | 358/211 |
| 4,862,257 | 8/1989 | Ulich ............................. | 358/211 |

Primary Examiner—Stephen Brinich
Attorney, Agent, or Firm—Townsend and Townsend

[57] ABSTRACT

An improved image intensifier system including an image intensifier, a camera operative to receive the output of the image intensifier and to transmit a signal including a multiplicity of pixel sets, a television monitor operative to receive the television signal from the camera and to translate such a signal into an image, and apparatus for reducing spikes in an image by detecting the spikes in a given pixel set, henceforth called the first pixel set, and replacing the spikes with information derived from a different pixel set, henceforth called the second pixel set.

41 Claims, 4 Drawing Sheets

1

IMAGE INTENSIFIER SYSTEM

FIELD OF THE INVENTION

The present invention relates to image intensifiers generally and more particularly to apparatus for digital image processing useful with image intensifiers.

BACKGROUND OF THE INVENTION

Image intensifiers are widely used in night vision applications and often employ a television front end. The resulting output may be viewed directly by a user or may be processed by various computer techniques to provide image enhancement.

A significant difficulty has been encountered in the use of image intensifiers and has severely limited their applicability both for direct viewing and for downstream image enhancement. This difficulty involves the random appearance of small, short-lived bright areas in a series of images, known as spikes. The occurrence of such spikes greatly detracts from the overall image quality, particularly in images with a low background light level of the type often encountered in night vision. As a result of the random occurrence of such spikes, the effectiveness of downstream image enhancement processing is limited. It would be desirable to provide a correction method which would render the images as clean as those recorded during the daytime.

SUMMARY OF THE INVENTION

The present invention seeks to provide a technique and apparatus for substantially overcoming the difficulties associated with spikes in image intensifiers.

There is thus provided in accordance with a preferred embodiment of the present invention an improved image intensifier system including an image intensifier, a camera operative to receive the output of the image intensifier and to transmit a signal including a multiplicity of pixel sets, a television monitor operative to receive the television signal from the camera and to translate such a signal into an image, and apparatus for reducing spikes in an image by detecting the spikes in a given pixel set, henceforth called the first pixel set, and replacing the spikes with information derived from a different pixel set, henceforth called the second pixel set.

Additionally, there is provided in accordance with a preferred embodiment of the invention a method of image intensification comprising the steps of receiving light from an image and providing an image intensified light output, receiving the image intensified light output and transmitting a television signal including a multiplicity of pixel sets and reducing spikes in the television output. The step of reducing spikes comprises the steps of detecting the spikes in a first pixel set and replacing the spikes with information derived from a second pixel set.

According to a preferred embodiment of the invention, the step of reducing spikes includes differencing elements of the first pixel set with elements of a derived signal based upon the second pixel set and subsequently comparing the differences thus produced with a threshold level. The elements of the derived signal are derived from information in an area of the second pixel set corresponding to an area around the corresponding elements of the first pixel set. The comparison produces a new signal which is equivalent to the elements of the first pixel set if the differences are less than the threshold level and is equivalent to the elements of the derived signal if the differences are greater or equal to the threshold level.

In accordance with one embodiment of the invention the television signal is interlaced, producing alternate fields consisting entirely of lines of a given parity, where any two consecutive fields constitute an image, known in the television field as a frame. In accordance with a second embodiment of the invention, the television signal is non-interlaced, such as produced by a progressive scanning method. The progressive method produces fields consisting alternately of the upper half of the image and the lower half of the image. In a third embodiment of the invention, the television signal is large format for which standards have not yet been agreed upon.

In conjuction with the embodiment of the invention with the interlaced television signal, the pixel set is a field consisting entirely of lines of a given parity, and any two consecutive fields constitute an image. In conjunction with the embodiment of the invention with the progressive scanning method in which the fields are replaced by the lower or upper halves of the frame, the pixel set is the entire frame, consisting of both the upper half of the image and the lower half of the image.

Additionally, in accordance with a preferred embodiment of the invention, the pixel sets are consecutive. According to one embodiment of the invention the first and second pixel sets are corrected and stored separately. According to a second embodiment of the invention, the corrected pixel sets are stored in an interlaced manner. According to a third embodiment of the invention, the two pixel sets are corrected separately but stored together, where elements of the corrected form of the first pixel set replace corresponding elements of the second pixel set.

Further, in accordance with one embodiment of the invention the television signal is digital. According to one embodiment of the invention the digital signal is the output of a digital television camera such as a Charge-Coupled Device (CCD) camera. In a second embodiment of the invention, the signal is the digitized output of an analog television camera, such as a Silicon Intensified Television (SIT) or an Intensified Silicon Intensified Television (ISIT) camera. In a third embodiment of the invention, the signal is the analog output of an analog television camera.

Finally, in accordance with one embodiment of the invention the apparatus for reducing spikes includes digital electronic circuitry, such as a digital memory. In accordance with an alternative embodiment of the invention, the apparatus for reducing spikes includes analog electronic circuitry, such as an analog or semi-analog memory, such as a video-disk.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
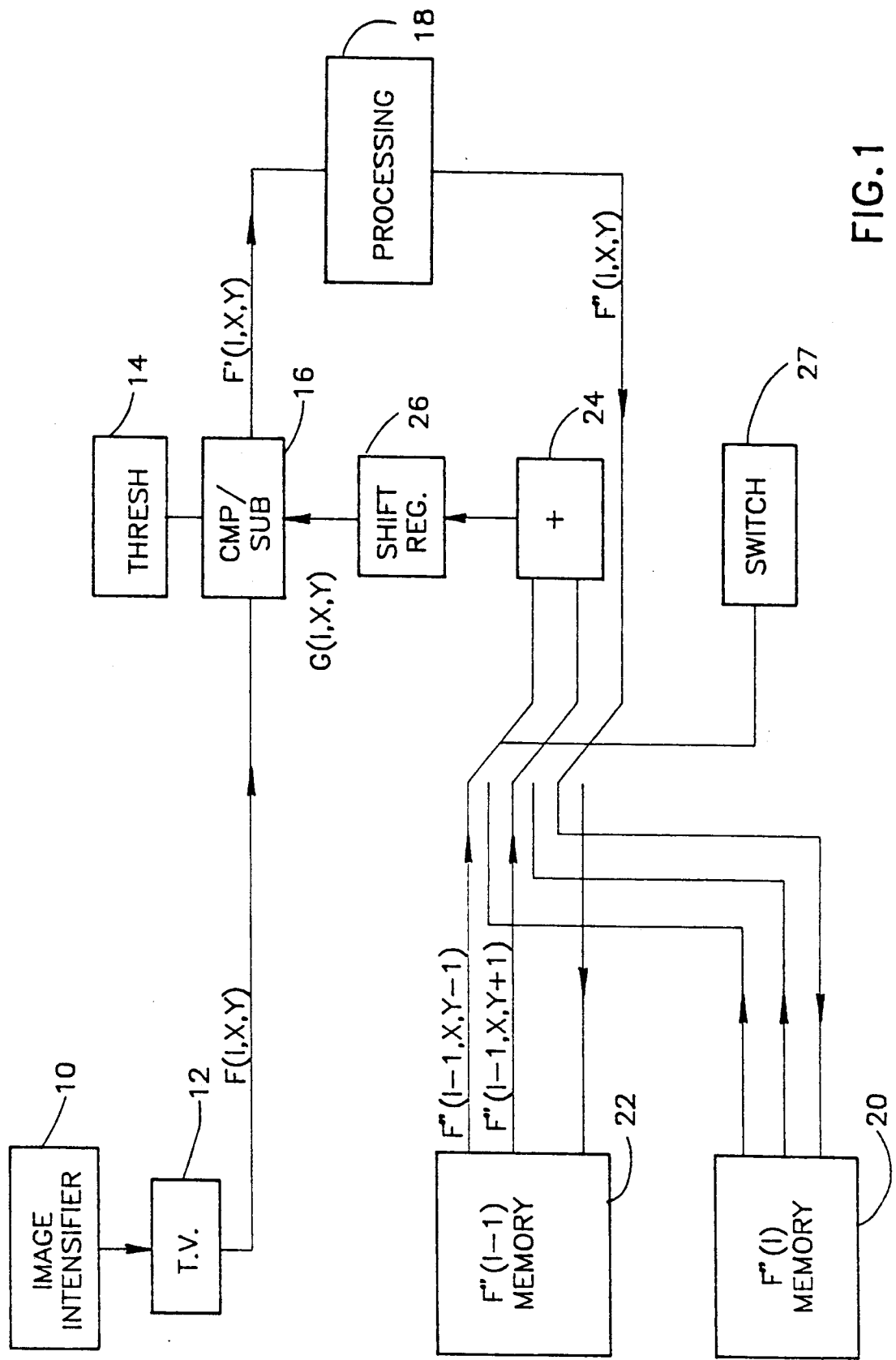
FIG. 1 is a block diagram illustration of an embodiment of the invention comprising two memory areas, each storing one entire image field.

An objective of the present invention is to reduce the noise introduced by short-lived spikes from image intensifiers used to enhance the night vision of television cameras, such as CCD cameras or other digital or analog cameras. Accordingly, an embodiment of the invention has been diagrammed in FIG. 1. An image intensifier 10 enhances an image which is subsequently received by a television camera 12.

The image intensifier 10 and the television camera 12 can be combined into one component, such as the CAM-3000I ICCD camera from Fairchild, operating with an interlaced scanning method. The television camera 12 produces a first pixel set I of the image, the current pixel set, which, in the case of the interlaced scanning method, is known as a field and comprises only lines of a given parity. A second pixel set, typically the previous pixel set, I−1, comprises only lines of the parity opposite that of pixel set I.

A user defined threshold level T is defined in block 14. The value of pixel set I at each individual pixel is denoted F(I,X,Y), where X and Y denote positions in the total image comprised, in the case of the interlaced scanning method, from two consecutive fields. X denotes the column position of the pixel, or in other words, along the line scan or in the 'horizontal direction'. Y denotes the row position of the pixel or, in other words, across the line scan or in the 'vertical direction'.

From F(I,X,Y) the system subtracts the corresponding element of a reference signal G(I), G(I,X,Y), typically consisting of the mean value of the two vertical neighbors of pixel X,Y present in the second, typically corrected, pixel set I−1, and the difference is compared to the threshold level T. G(I) is discussed in more detail hereinbelow. The subtraction and comparison is performed by a subtraction/comparator 16, producing F'(I) according to the following algorithm.

The element of G(I) corresponding to the X,Y pixel of pixel set I, G(I,X,Y), is subtracted from F(I,X,Y) and their difference is compared to the threshold level T. If the difference is larger than the threshold T (i.e. a spike probably exists at pixel X,Y), F'(I,X,Y) is set equal to G(I,X,Y). If, however, the difference is smaller than or equal to the threshold, then there is no spike and F'(I,X,Y) is set to F(I,X,Y), the current value at pixel X,Y. It will be appreciated that special treatment is necessary for calculating G(I,X,Y) at the topmost and bottommost lines of the total image. According to a preferred embodiment of the invention, the case of the extreme edges, G(I,X,Y) is set to either of the existing possible values F''(I−1,X,Y+1) or F''(I−1,X,Y−1). According to another embodiment of the invention, in the case of the extreme edges, F'(I,X,Y) is set to F(I,X,Y) and G(I,X,Y) is not used. This embodiment leaves uncorrected any spikes which may occur on the extreme edges of the image.

F'(I) optionally undergoes additional processing, such as filtering, in a processing block 18, to produce the corrected pixel set F''(I) which is stored in a fast memory area 20, such as a RAM for a digital embodiment or alternately, a videodisk for an analog embodiment. It will be appreciated that such processing should not change the mean level of the signal F'(I).

The values of the second corrected pixel set I−1, F''(I−1), were previously stored in a separate memory area 22.

To create the reference signal G(I,X,Y), the value of the elements of the second corrected pixel set I−1 above and below the element X,Y of pixel set I, F''(I−1,X,Y+1) and F''(I−1,X,Y−1), are typically added to each other by an adder 24 and then divided by two by a shift register 26. Other similar methods of combining F''(I−1,X,Y+1) and F''(I−1,X,Y−1) may be used to produce G(I,X,Y). It will be appreciated that G(I,X,Y) represents the value, in the second pixel set I−1, which corresponds to that of pixel X,Y in the first pixel set I.

When pixel set I is completely corrected and stored, and before pixel set I+1 undergoes the correction process, switch 27 changes the data flow such that the adder 24 receives its data from memory area 20. In addition, output signal F''(I+1) is stored into memory area 22.

Figure 2:
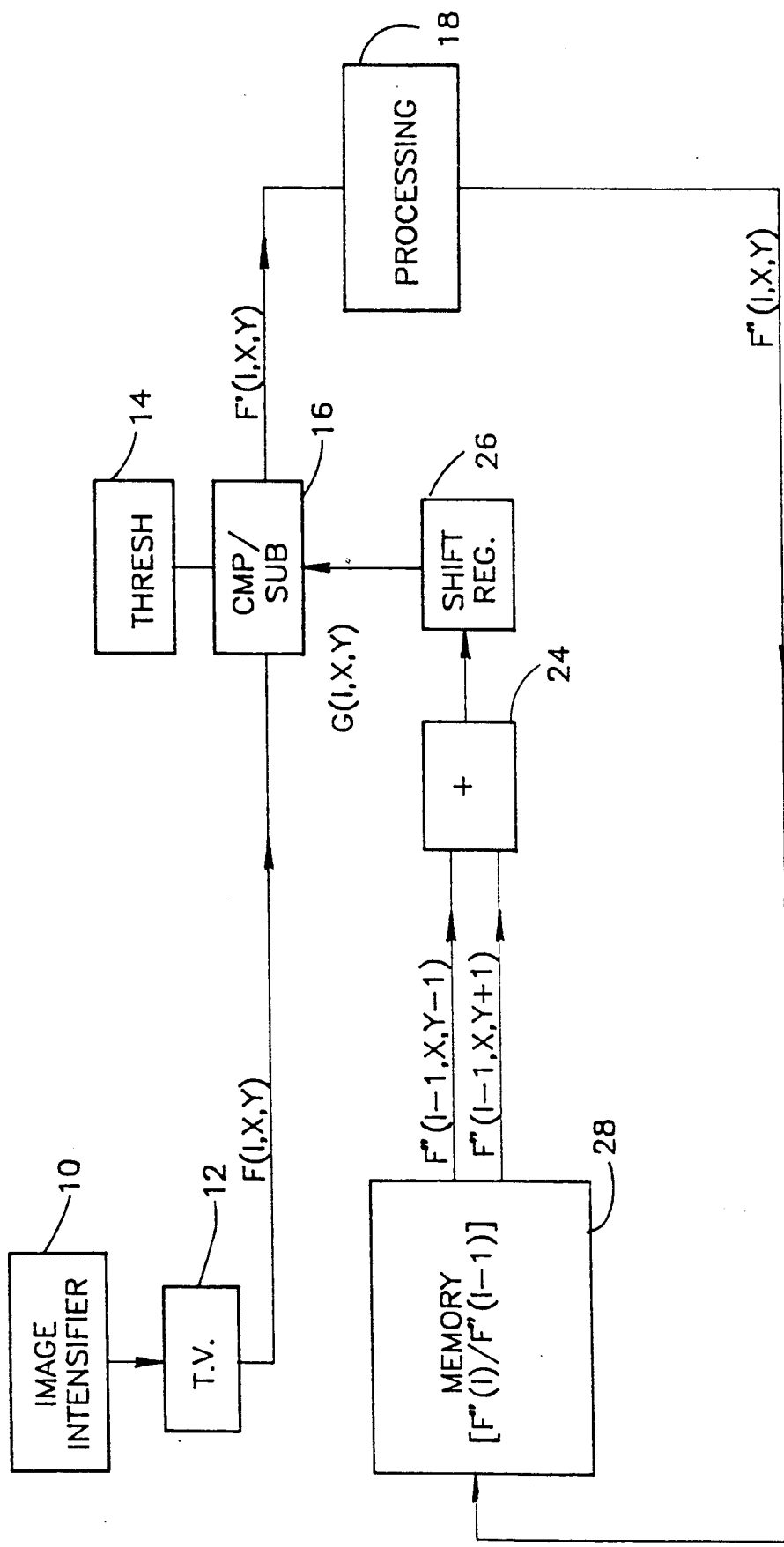
FIG. 2 is a block diagram illustration of an embodiment of the invention in which the entire interlaced image is stored in a single memory area.

The embodiment of the invention described hereinabove effectively enhances intensified night images. A second embodiment produces the same results but requires only a single memory area that is twice as large as each of memory areas 20 and 22. FIG. 2 diagrams the second embodiment.

As per the first embodiment, the image intensifier 10 intensifies a night image which is subsequently received by the television camera 12 which, in turn, produces the pixel set I. The user defined threshold level T is defined in block 14. The values G(I,X,Y) are subtracted from F(I,X,Y) and the difference is compared to the threshold level T by the subtractor/comparator 16, producing F'(I) according to the algorithm described hereinabove.

F'(I) optionally undergoes additional processing in the processing block 18 to produce F''(I), which is stored in a memory area 28 having storage for an entire image. Thus, for an image scanned by the interlaced method, the elements of F''(I) are entered into every other row of memory area 28 with the elements of F''(I−1) residing in the remaining rows. At the moment that row Y of field I is entered into memory area 28, the memory area 28 contains the data as follows: Every row from row 1 to row Y−2 having the same parity as row Y contains the values F''(I) produced from the current field; the remaining rows having the same parity as row Y contain the values F''(I−2), produced from the field before the previous one; and all the rows having the opposite parity to that of row Y contain the values F''(I−1) produced from the previous field.

As per the first embodiment of the invention, the values F''(I−1,X,Y+1) and F''(I−1,X,Y−1) are added to each other by an adder 24 and then divided by two by a shift register 26 producing G(I,X,Y) used by subtractor/comparator 16.

In this second embodiment of the invention switch 27 is not necessary since each line of the image has its own place in memory area 28.

In a third embodiment of the invention, memory area 28 is replaced by a smaller memory area, similar in size to memory areas 20 and 22, and a FIFO memory, thus creating a slightly smaller system.

Figure 3:
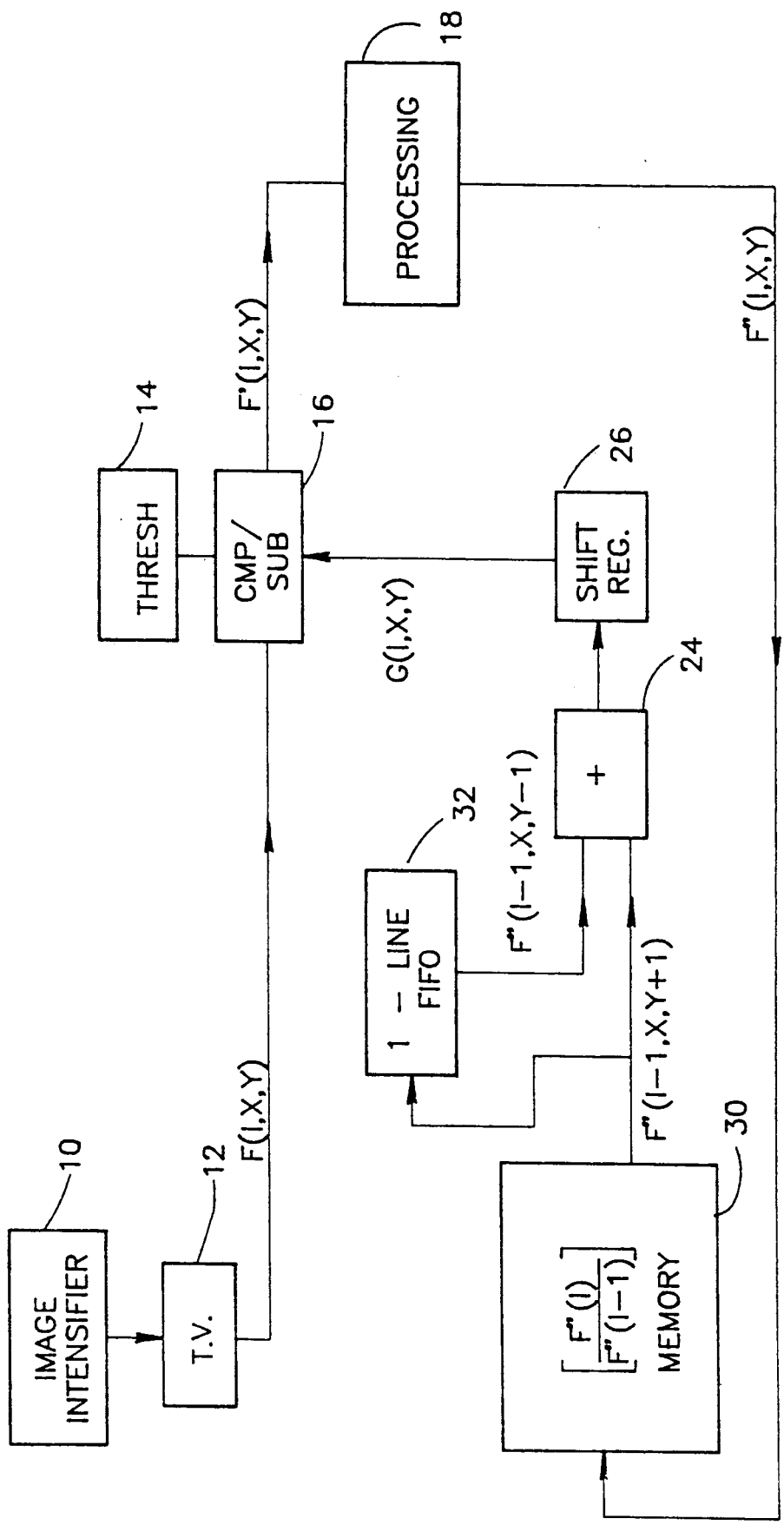
FIG. 3 is a block diagram illustration of an embodiment of the invention comprising a First-In-First-Out (FIFO) memory area and a memory area holding only one field.

Reference is now made to FIG. 3. As per the first and second embodiments, the image intensifier 10 enhances an image which is subsequently received by the television camera 12 which, in turn, produces the pixel set I of the image. The user defined threshold level T is defined in block 14. The values G(I,X,Y) are subtracted from the values F(I,X,Y) and the difference is compared to the threshold level T by the subtractor/comparator 16, producing F'(I) according to the algorithm described hereinabove.

F'(I) optionally undergoes additional processing in the processing block 18 to produce F"(I) which is stored in a memory area 30 capable of storing only one pixel set. As per the second embodiment of the invention, the new data replaces the old data in memory area 30. In the present embodiment of the invention, line Y of the current pixel set I is to be written into row J of the memory area 30, where J is equal to (Y+Parity(I))/2 and where Parity(I) is 0 for an even field and 1 for an odd field, overwriting any previous information stored therein. Before line Y of F"(I) is entered into memory area 30, area 30 contains the following: Rows one through J−1 contain lines (2−Parity(I)) through (2J−2−Parity(I)) of F"(I) and rows J through to the last row of area 30 contain lines (2J−Parity(I−1)) to the last line of F"(I−1).

Line Y−1 of F"(I−1), stored in a one-row FIFO memory 32 and which was previously row J=(Y−1+Parity(I−1))/2 in memory area 30, is copied out of FIFO memory 32 as line Y+1 of F"(I−1) is copied from row J'=(Y−Parity(I))/2+1 of memory area 30 into FIFO memory 32. At the same time, line Y of F"(I) is entered into row J of memory area 30. Thus, line Y+1 of F"(I−1) is preserved for the next set of calculations, becoming the next line Y−1.

Adder 24 receives line Y−1 of F"(I−1) from FIFO memory 32 and line Y+1 of F"(I−1) from line J+1 of memory area 30, adds the two values together and sends them to shift register 26.

As per the previous two embodiments, G(I,X,Y) is preferably produced by a shifting operation performed by shift register 26 on the result from adder 24.

Figure 4:
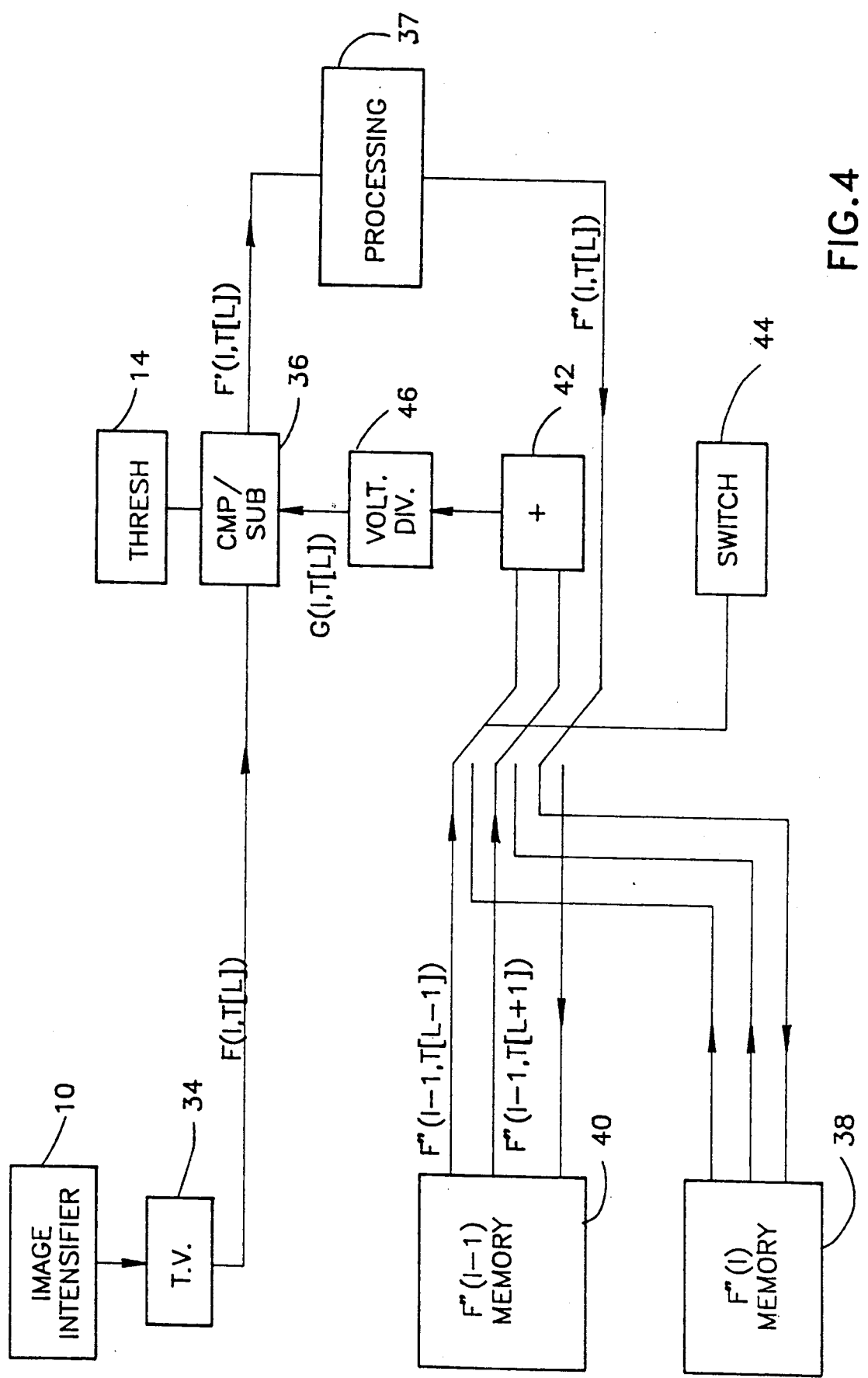
FIG. 4 is a block diagram illustration of an embodiment of the invention comprising analog signals, analog memories, and analog electronic circuitry.

The embodiments described hereinabove have digital components operating on a digital signal. However, each component, or all of them, can be replaced by analog circuitry operating on analog signals. For example, a completely analog embodiment of the first digital embodiment is shown in FIG. 4. As per the first embodiment, image intensifier 10 enhances an image which is subsequently received by a television camera 34 whose output is an analog signal, F(I,T[L]), where I indicates the pixel set, as before, T[L] indicates the time from the last synchronization marker, known in the television field as a vertical sync, marking the beginning of the field and as such, denotes both the row and column position of the pixel, and T[L] indicates the time at which line L of an image appears.

As per the previous embodiments, a threshold level is defined in block 14. An analog subtractor/comparator 36 compares the value of the difference between the input signal to the subtractor/comparator F(I,T[L]) and the reference signal G(I,T[L]), defined hereinbelow, with the threshold level T. As per the previous embodiments, if the difference is larger than the threshold T indicating the existence of a spike, F'(I,T[L]) is set equal to G(I,T[L]). If, however, the difference is smaller than or equal to the threshold, then there is no spike and F'(I,T[L]) is set to F(I,T[L]).

As per the previous embodiments, F'(I) optionally undergoes additional processing. Block 37 performs the processing and produces F"(I).

F"(I) is stored in memory area 38, such as a video disk.

G(I,T[L]) is calculated from F"(I−1), previously stored in memory area 40 which is also comprised of a video disk, as follows. The elements of F"(I−1) in the lines above and below F(I,T[L]), F"(I−1,T[L−1]) and F"(I−1,T[L+1]) respectively, are combined into G(I,T[L]) by an analog summer 42, and a signal voltage divider 46.

Upon completion of the correction and storage of pixel set I, and before pixel set I+1 undergoes the correction process, switch 44 changes the data flow such that analog summer 42 receives its data from memory area 38.

All the embodiments described hereinabove are designed to optimally improve a static image. However, in moving images, created by the movement of the camera and intensifier or by the movement of objects within the field of view of the camera and intensifier, the embodiments may cause loss of data. In particular, the leading edge of bright objects may disappear or be reduced if the threshold cannot differentiate between it and a spike. Embodiments which overcome this limitation, at the expense of reducing the spikes instead of eliminating them, are similar to the embodiments described hereinabove except that the output signal F'(I) from the subtractor/comparator 16 is a combination of the input signals F(I) and G(I) as follows. If no spike is detected, the output signal F'(I) is set equal to the current signal F(I), while if a spike is detected, F'(I) is set equal to a linear combination of the two signals, such as A*G(I,X,Y)+(1−A)*F(I,X,Y), where A may be a constant, typically close to 1 such as 0.8, or A may be responsive to the user in addition to, or separate from, the speed of that which is causing the motion. It will be appreciated that the abovementioned correction method reduces noise spikes to (1−A) of their uncorrected values and forces edges of bright objects to reach their full value after at most 1/(1−A) fields.

It will be appreciated by persons skilled in the art that the present invention is not limited by what is particularly shown and described hereinabove. Rather the scope of the present invention is defined only by the claims which follow:

I claim:
1. An image intensification system comprising:
   an image intensifier for receiving light from an image and providing an image intensifier light output;
   a camera for receiving said image intensified light output and for transmitting a television signal including a multiplicity of pixel sets;
   a television monitor for receiving said television signal and for translating said television signal into a television image;
   means for reducing spikes in said television signal by detecting the spikes in a first pixel set and correcting the spikes with information derived form a second pixel set.
2. An image intensifier system according to claim 1 and wherein said television signal is interlaced.
3. An image intensifier system according to claim 1 and wherein said television signal is non-interlaced.
4. An image intensifier system according to claim 1 and wherein said television signal is large format.
5. An image intensifier system according to claim 2 and wherein said pixel sets are fields.

6. An image intensifier system according to claim 3 and wherein said pixel sets are frames and wherein a frame is two consecutive fields.

7. An image intensifier system according to claim 1 and wherein said first and second pixel sets are corrected and stored separately.

8. An image intensifier system according to claim 5 and wherein said first and second pixel sets are corrected separately and stored in an interlaced manner.

9. An image intensifier system according to claim 1 and wherein said first and second pixel sets are corrected separately and stored together and wherein elements of the corrected form of said first pixel set replace corresponding elements of said second pixel set.

10. An image intensifier system according to claim 1 and wherein said television signal is a digital signal.

11. An image intensifier system according to claim 10 and wherein said television signal is the output of a digital television camera.

12. An image intensifier system according to claim 10 and wherein said television signal is the digitized output of an analog television camera.

13. An image intensifier system according to claim 1 and wherein said television signal is the output of an analog television camera.

14. An image intensifier system according to claim 11 and wherein said camera comprises a CCD camera.

15. An image intensifier system according to claim 12 and wherein said camera comprises an SIT or ISIT camera.

16. An image intensifier system according to claim 13 and wherein said camera is an ISIT camera.

17. An image intensifier system according to claim 1 and wherein said means for reducing spikes include a digital memory.

18. An image intensifier system according to claim 1 and wherein said means for reducing spikes include an analog memory.

19. An image intensifier system according to claim 1 and wherein said means for reducing spikes include a semi-analog memory.

20. An image intensifier system according to claim 1 and wherein said means for reducing spikes include means for differencing elements of said first pixel set with elements of a derived signal based upon said second pixel set and means for comparing said differences between said elements of said first pixel set and said elements derived from said second pixel set with a threshold level.

21. An image intensifier system according to claim 20 and wherein said elements of said derived signal are derived from information in an area of said second pixel set equivalent to an area around said elements of said first pixel set.

22. An image intensifier system according to claim 20 and wherein said means for comparing produces a new signal which is equal to the elements of the first pixel set if said differences are less than the threshold level and is equal to said elements of said derived signal if said differences are greater or equal to said threshold level.

23. An image intensifier system according to claim 22 and wherein said means for differencing and for comparing produces a new signal which is equal to a linear combination of said elements of said first pixel set and said elements of said derived signal if said differences are greater or equal to said threshold level.

24. An image intensifier system according to claim 1 and wherein said first and second pixel sets are consecutive.

25. A method of image intensification comprising the steps of:
receiving light from an image and providing an image intensified light output;
receiving said image intensified light output and transmitting a television signal including a multiplicity of pixel sets; and
reducing spikes in said television output, said step of reducing comprising the steps of:
detecting the spikes in a first pixel set; and
replacing the spikes with information derived from a second pixel set.

26. A method according to claim 25 and wherein said television signal is interlaced.

27. A method according to claim 25 and wherein said television signal is non-interlaced.

28. A method according to claim 25 and wherein said television signal is large format.

29. A method according to claim 25 and wherein said pixel sets are fields.

30. A method according to claim 25 and wherein said pixel sets are frames.

31. A method according to claim 25 and wherein said first and second pixel sets are corrected and stored separately.

32. A method according to claim 25 and wherein said first and second pixel sets are corrected separately and stored together and wherein elements of the corrected form of said first pixel set replace corresponding elements of said second pixel set.

33. A method according to claim 26 and wherein said first and second pixel sets are corrected separately and stored in an interlaced manner.

34. A method according to claim 26 and wherein said first and second pixel sets are consecutive.

35. A method according to claim 25 and wherein said step for reducing spikes include a step of differencing elements of said first pixel set with elements of a derived signal based upon said second pixel set and a step of comparing said differences between said elements of said first pixel set and said elements derived from said second pixel set with a threshold level.

36. A method according to claim 35 and wherein said elements of said derived signal are derived from information in an area of said second pixel set equivalent to an area around said elements of said first pixel set.

37. A method according to claim 35 and wherein said step of comparing produces a new signal which is equal to said elements of said first pixel set if said differences are less than said threshold level and is equal to said elements of said derived signal if said differences are greater or equal to said threshold level.

38. A method according to claim 35 and wherein said step of differencing and comparing produces a new signal which is equal to a linear combination of said elements of said first pixel set and said elements of said derived signal if said differences are greater or equal to said threshold level.

39. A method according to claim 25 and wherein said step of reducing comprises the steps of the following algorithm:

$$F'(I,X,Y) = \begin{cases} G(I,X,Y) & \text{if } F(I,X,Y) - G(I,X,Y) > T_h \\ F(I,X,Y) & \text{otherwise} \end{cases}$$

where
F(I,X,Y) is a digital element of said first pixel set, $T_h$ is said threshold level, F'(I,X,Y) is a digital corrected element of said first pixel set and G(I,X,Y) is defined as $$G(I,X,Y) = [F''(I-1, X, Y+1) + F''(I-1, X, Y-1)]/2$$

where
F''(I−1) is said corrected and stored second pixel set.

40. A method according to claim 25 and wherein said step of reducing comprises the steps of the following algorithm:

$$F'(I,T[L]) = \begin{cases} G(I,T[L]) & \text{if } F(I,T[L]) - G(I,T[L]) > T_h \\ F(I,T[L]) & \text{otherwise} \end{cases}$$

where
F(I,T[L]) is an analog element of said first pixel set, $T_h$ is said threshold level, F'(I,T[L]) is an analog corrected element of said first pixel set and G(I,T[L]) is defined as $$G(I,T[L]) = [F''(I-1,T[L+1]) + F''(I-1,T[L-1])]/2$$

where
F''(I−1) is said corrected and stored second pixel set.

41. A method according to claim 25 and wherein said step of reducing comprises the steps of the following algorithm:

$$F'(I,X,Y) = \begin{cases} A^*G(I,X,Y) + (1-A)^*F(I,X,Y) & \text{if } F(I,X,Y) - G(I,X,Y) > T_h \\ F(I,X,Y) & \text{otherwise} \end{cases}$$

where
F(I,X,Y) is an element of said first pixel set, A is a predetermined constant, $T_h$ is said threshold level, F'(I,X,Y) is a corrected element of said first pixel set and G(I,X,Y) is defined as $$G(I,X,Y) = [F''(I-1, X, Y+1) + F''(I-1, X, Y-1)]/2$$

where
F''(I−1) is said corrected and stored second pixel set.

* * * * *